US007115155B2

(12) United States Patent
Stead

(10) Patent No.: US 7,115,155 B2
(45) Date of Patent: Oct. 3, 2006

(54) AIR FILTRATION APPARATUS AND AROMATIZER

(76) Inventor: Ronald Donald Stead, P.O. box 614, Ortonville, MI (US) 48462

( * ) Notice: Subject to any disclaimer, the term of this patent is extended or adjusted under 35 U.S.C. 154(b) by 30 days.

(21) Appl. No.: 10/727,382

(22) Filed: Dec. 4, 2003

(65) Prior Publication Data

US 2005/0011354 A1  Jan. 20, 2005

Related U.S. Application Data

(60) Provisional application No. 60/431,104, filed on Dec. 6, 2002.

(51) Int. Cl.
*B01D 47/00* (2006.01)
(52) U.S. Cl. .............. 95/218; 96/222; 96/269; 96/270; 96/280; 96/287; 96/361; 261/88
(58) Field of Classification Search .......... 95/218, 95/226, 270; 55/400, 401; 96/222, 268, 96/269, 270, 280, 281, 283, 284, 286, 287, 96/361; 261/34.1, 88
See application file for complete search history.

(56) References Cited

U.S. PATENT DOCUMENTS

| 1,082,245 A | * | 12/1913 | Thomas ................... 261/30 |
| 2,218,198 A | * | 10/1940 | Harris .................... 261/30 |
| 3,130,245 A | * | 4/1964 | Banks .................... 261/29 |
| 3,131,212 A | * | 4/1964 | Biller .................... 554/136 |
| 3,283,478 A | * | 11/1966 | Briggin et al. ............ 96/284 |
| 3,421,745 A | * | 1/1969 | Prupis .................... 261/35 |
| 3,495,813 A | * | 2/1970 | Marenghi et al. .......... 266/202 |
| 3,645,070 A | * | 2/1972 | Roe ....................... 96/281 |
| 5,215,685 A | * | 6/1993 | Marino ................... 261/72.1 |
| 5,578,113 A | * | 11/1996 | Glenn ..................... 96/52 |
| 6,179,903 B1 | * | 1/2001 | Muller ..................... 96/55 |
| 6,196,527 B1 | * | 3/2001 | Huang .................... 261/142 |

* cited by examiner

*Primary Examiner*—Frank M. Lawrence
(74) *Attorney, Agent, or Firm*—Charles W. Chandler

(57) ABSTRACT

An air filtration and aromatizer apparatus which includes a housing, a motor in the housing with a fan for drawing air through an inlet toward an outlet through a pollution-collecting chamber, and an elongated hollow tubular perforated member having an upper end connected to the motor output shaft and a lower end disposed in a bath of water. The hollow tubular member is formed in such a manner that as it is rotated by the motor, it draws water from the container under the influence of centrifugal force, and then forces the water through the perforations to form a mist or rain-like atmosphere in the path of motion of the air passing from the housing inlet toward the housing outlet.

9 Claims, 2 Drawing Sheets

AIR FILTRATION APPARATUS AND AROMATIZER

CROSS-REFERENCE TO RELATED APPLICATION

This application claims priority of Provisional Patent Application filed Dec. 6, 2002, Ser. No. 60/431,104 for RAIN STORM.

BACKGROUND AND SUMMARY OF THE INVENTION

This invention relates to an air cleaning apparatus having a pollution-collecting chamber, a container of water, and a rotatable elongated perforated tubular member having a lower and disposed in the water such that as the tubular member is rotated, the water is drawn up into the tube and out through the perforations to form a rain-like spray in the path of motion of air in the chamber.

Many air filtration devices, such as vacuum cleaners and the like, have a housing with a motor for passing air through the housing and one or more filters. In some cases the prior art devices use a water bath filter in which the unfiltered air is passed through the water to remove pollutants from the air.

The broad purpose of the present invention is to provide an improved air filtration apparatus and aromatizer having relatively few components, as well as a novel way for forming a water mist for collecting pollutants from the air.

The preferred embodiment of the invention comprises a frusto-conical housing having a motor at its upper, narrow end and a container of water at its base. A pollution-collecting chamber is disposed between the motor and the container of water. The unfiltered air is passed down into the chamber through a pair of tubes to impact on the surface of water, which functions as an initial filter.

The motor is connected to the upper end of an elongated tube. The tube has a lower end disposed in the water. The curvature of the tube is such that as the tube is rotated by the motor, the lower tube end draws water up into the mid-section of the tube where it then issues through perforations in the tube into the pollution-collecting chamber as a mist. The mist is disposed in the path of motion of air in the pollution-collecting chamber. The mist removes further pollutants from the water and passes the filtered air upwardly where it then passes through a H.E.P.A. and charcoal filter. A lazy susan support carries aromatic products to aromatize the filtered air.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 2:
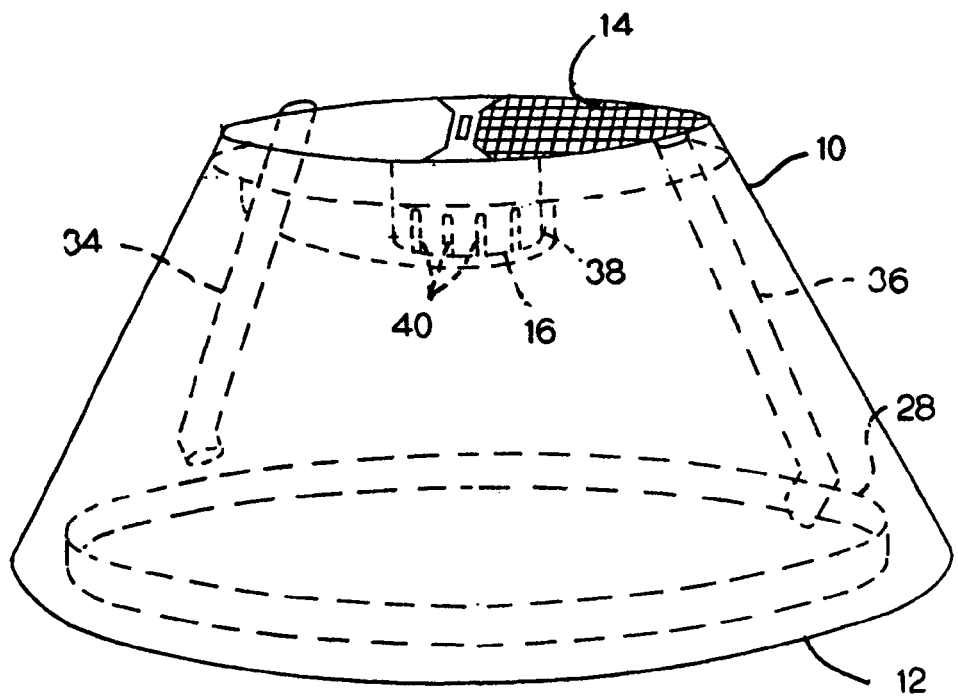
FIG. 2 is an elevational view of the preferred apparatus.
Figure 3:
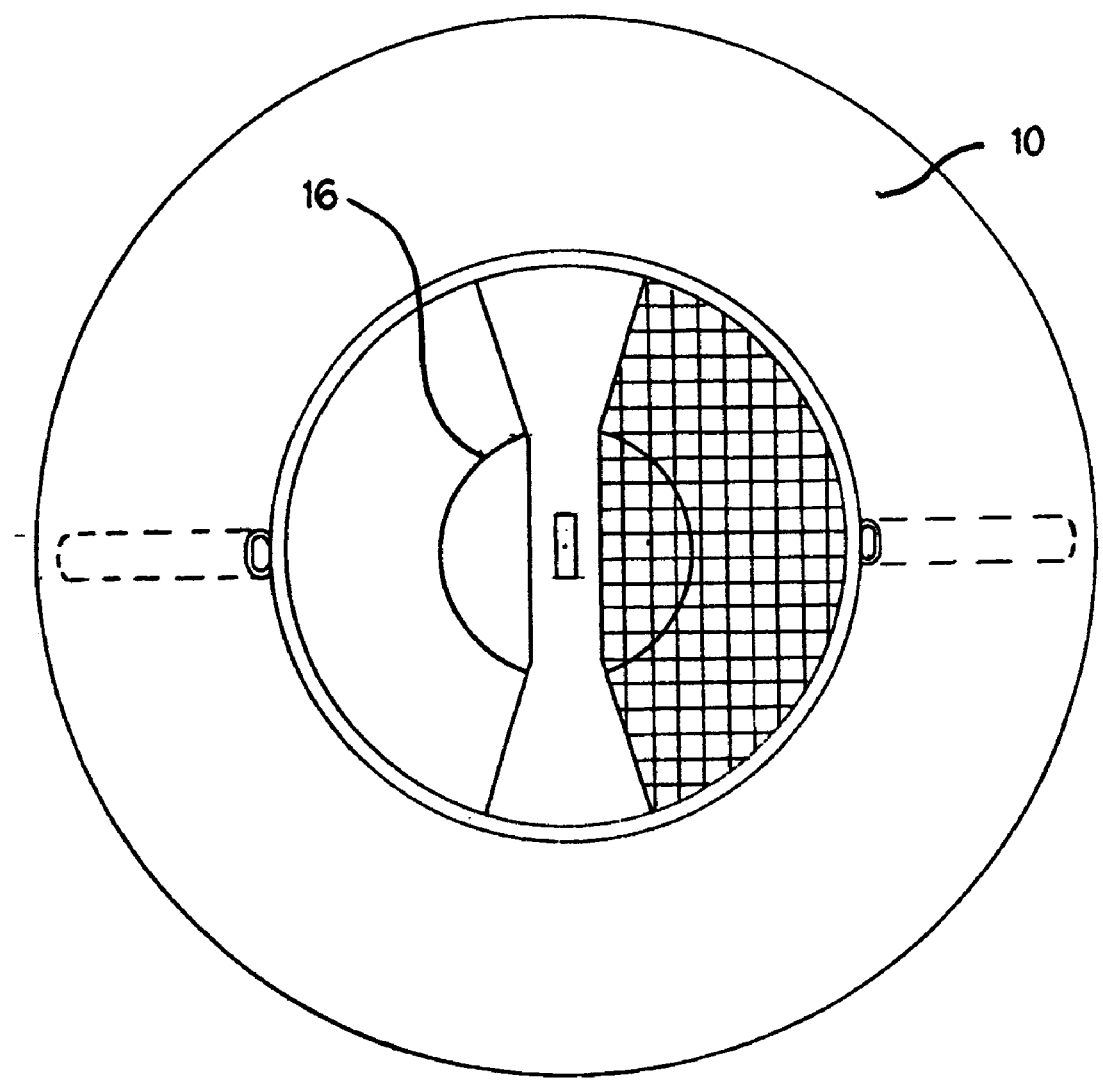
FIG. 3 is a plan view of the preferred apparatus.

Referring to the drawings, FIGS. 2 and 3 illustrate a preferred air filtration apparatus which includes a transparent housing 10 having a frusto-conical configuration with a wide base 12 and a narrow opening 14 at the upper end of the housing. A squirrel cage motor 16 is suspended by support 18 adjacent opening 14.

Motor 16 is a brushless motor, either a high impedance or switch reluctant, able to run 24 hours a day. The motor has a downwardly directed output shaft 20 which carries an elongated curved rain tube 22. Tube 22 has a plurality of small openings 24 extending along a major portion of the tube length down to an inlet opening 26.

Figure 1:
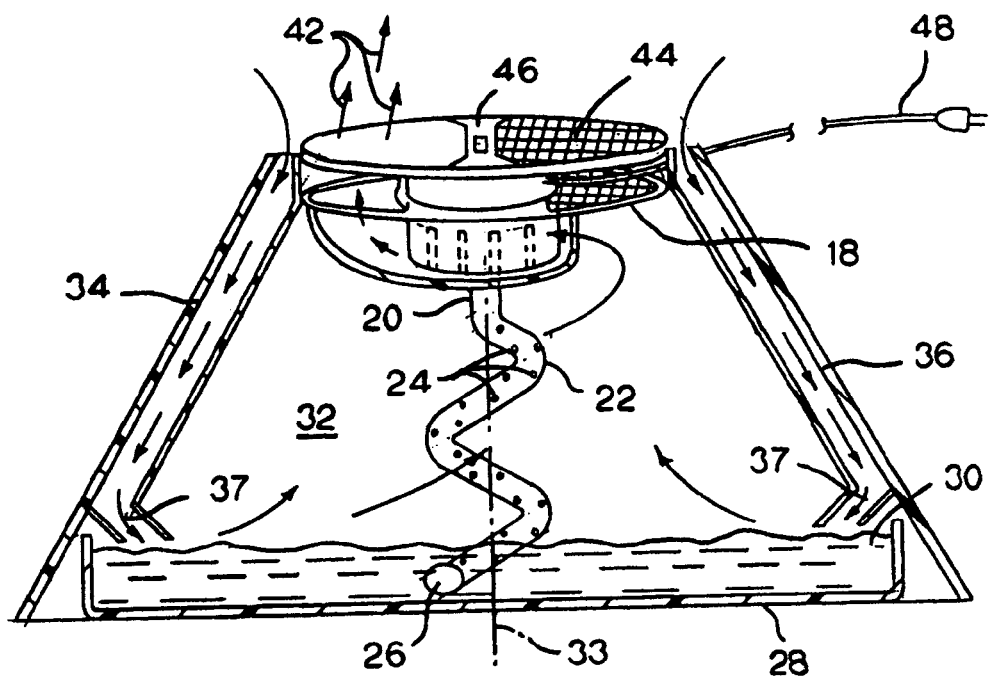
FIG. 1 is sectional view through an air filtration apparatus and aromatizer illustrating the preferred embodiment of the invention, but removed from the housing for clarity.

Referring to FIG. 1, a container 28 is disposed adjacent the base of the housing, beneath the motor. The container is intended to hold a bath of water 30. The lower inlet end of tube 22 extends below the water surface. The tube is formed in such a manner that as it is rotated about an axis 33, portions of the tube, spaced from the axis of rotation, draw water through lower end 26 into the tube under the influence of centrifugal force which then causes the water to issue through openings 24 into a pollution-collecting chamber 32.

A pair of tubes 34 and 36 each have an upper end disposed adjacent the upper narrow end of the housing, and a lower end directed toward the surface of the water, as indicated by arrow 37. The air is drawn into the housing, then enters the pollution-collecting chamber by impacting on the surface of the water which removes some of the pollutants in the air.

Tubes 34 and 36 are attached to the inside surface of housing 10.

Motor 16 has a squirrel cage 38 with a plurality of fan blades 40 which draw the air from the inlet opening toward opening 14. As the air passes through chamber 32, rotating tube 22 creates a rain-like mist in the pollution-collecting chamber which removes wetable pollutants from the air. The air then passes upwardly in the direction of arrows 42 and passes through a H.E.P.A. and charcoal filter 44, and then through a lazy susan filter rotator 46 which contains aromatic materials. Rotator 46 adds a fragrance to the filtered air. The H.E.P.A. and charcoal filter or other media filters non-wetable particulates out of the air. The motor is sealed to protect the motor from water or from any moisture. A power cord 48 supplies electrical power to the motor.

Thus it is to be understood that I have described an improved air filtration and aromatizer apparatus which draws water from a container of water, and creates a water mist in the path of motion of the air to remove pollutants from the air. The air then passes upwardly through a H.E.P.A. and charcoal filter and then becomes fragrant by the lazy susan apparatus.

The lazy susan apparatus allows the clean filtered air to escape with aromatized air after being cleaned by the H.E.P.A. and charcoal filters. The motor support is sealed in such a manner that all the incoming air being discharged from the pollutant collecting chamber passes through the squirrel cage.

A cyclonic rain tube 22 scoops up water and spins it in a cyclonic action creating a rain storm, through which the incoming air must pass to be water washed.

I claim:

1. An air filtration apparatus, comprising:
   a housing having a pollution-collecting chamber for holding water that partially fills the chamber, an air inlet and an air outlet, both disposed above the surface of water in the pollution-collecting chamber;

a motor;

a fan mounted within the housing and connected to the motor for drawing air into said pollution-collecting chamber through the air inlet and for exhausting air from the pollution-collecting chamber through the air outlet;

an elongated vertical tube having a lower inlet end disposed in water in the pollution-collecting chamber;

means for connecting the vertical hollow tube to the motor for rotating the tube about a vertical axis;

the vertical tube having a plurality of vertically spaced openings supported above the water level in the pollution-collecting chamber, for discharging water received through said lower inlet end of the tube, as a spray under centrifugal force as the tube is rotated, into air containing wetable pollutants and passing upwardly along a path adjacent the tube; and whereby polluted air enters the pollution-collecting chamber and then passes upwardly adjacent to the opening means and through the spray to wet the wetable pollutants whereby the wetable pollutants remain in the pollution-collecting chamber, and the air passes toward said air outlet.

2. Apparatus as defined in claim 1, in which the housing inlet comprises a tube having an outlet in the pollution-collecting chamber for passing air from the air inlet, to impact the water surface to remove pollutants from air passing through the pollution-collecting chamber.

3. Apparatus as defined in claim 1, in which the motor is a squirrel cage motor having fan means for moving air from the air inlet through the pollution-collecting chamber and out the air outlet.

4. Apparatus as defined in claim 1 in which the vertical tube draws water from the water in the pollution-collecting chamber, and discharges the water issuing from the opening means in the vertical tube to create a mist of water in the path of motion of the air passing through the pollution-collecting chamber.

5. Apparatus as defined in claim 1 in which the vertical tube is an elongated curved tube having an upper end connected to the motor, and a lower portion disposed in the water in the container.

6. Apparatus as defined in claim 1, including a filter disposed in the path of the air passing from the pollution-collecting chamber to the air outlet.

7. Apparatus as defined in claim 1, including aromatic means for aromatizing air passing through the air outlet.

8. Apparatus as defined in claim 1, in which the motor is a brushless motor.

9. A method for removing pollutants from air containing pollutants, comprising the steps of:

providing a housing having a pollution-collecting chamber, an air inlet for receiving air into the pollution-collecting chamber and an air outlet for passing filtered air from the pollution-collecting chamber providing a body of water in the pollution-collecting chamber;

providing a motor having a rotatable output shaft, and fan fan means for passing air from the air inlet toward the air outlet;

connecting an elongated vertical tubular member to the output shaft for rotation; and rotating the tubular member such that a lower inlet opening in the body of water draws water into the tubular member, and then discharges the water through a plurality of vertically speced openings in the tubular member into the chamber to form a rain-like mist in the vertical tubular member;and in the path of air passing through the pollution-collecting chamber whereby the mist separates wetable pollutants from the air.

* * * * *